US 8,358,928 B2

(12) United States Patent
Appel et al.

(10) Patent No.: US 8,358,928 B2
(45) Date of Patent: Jan. 22, 2013

(54) LENS GUARD

(75) Inventors: Michael Wayne Appel, Durham, NC (US); Terry Lee Schmoeger, Raleigh, NC (US); Marc B. Kaye, Davie, FL (US); Walter Lefler, Rutherford, NJ (US)

(73) Assignee: Aadyn Technology, LLC, Fort Lauderdale, FL (US)

( * ) Notice: Subject to any disclaimer, the term of this patent is extended or adjusted under 35 U.S.C. 154(b) by 54 days.

(21) Appl. No.: 13/081,839

(22) Filed: Apr. 7, 2011

(65) Prior Publication Data

US 2011/0249965 A1 Oct. 13, 2011

Related U.S. Application Data

(60) Provisional application No. 61/323,011, filed on Apr. 12, 2010.

(51) Int. Cl.
*G03B 17/02* (2006.01)
(52) U.S. Cl. ......................... 396/535; 348/375
(58) Field of Classification Search .................. 396/535
See application file for complete search history.

(56) References Cited

U.S. PATENT DOCUMENTS

| | | | | |
|---|---|---|---|---|
| 1,283,963 | A | | 11/1918 | Takahashi |
| 3,162,107 | A | * | 12/1964 | Byers ............................... 396/27 |
| 4,131,914 | A | * | 12/1978 | Bricmont ........................ 348/83 |
| 4,176,701 | A | * | 12/1979 | Welgan ....................... 206/316.2 |
| 4,853,722 | A | * | 8/1989 | Gell, Jr. ........................... 396/26 |
| 4,927,017 | A | * | 5/1990 | Easter ......................... 206/316.2 |
| 5,305,031 | A | * | 4/1994 | Hayakawa ...................... 396/26 |
| 5,315,333 | A | | 5/1994 | Nash |
| 5,394,208 | A | * | 2/1995 | Campbell ..................... 396/429 |
| 5,456,277 | A | * | 10/1995 | Pontius, Jr. ..................... 135/90 |
| 5,625,854 | A | * | 4/1997 | White ........................... 396/429 |
| 5,689,734 | A | * | 11/1997 | Bauer et al. .................... 396/28 |
| 5,708,859 | A | * | 1/1998 | Tajima et al. .................. 396/25 |
| 6,527,871 | B1 | * | 3/2003 | Hanson et al. ................. 134/37 |
| 6,902,630 | B2 | * | 6/2005 | Ernst et al. ..................... 134/37 |
| 6,944,908 | B2 | * | 9/2005 | Hoetzer et al. .............. 15/316.1 |
| 7,140,744 | B2 | * | 11/2006 | Armstrong et al. ............ 362/34 |
| 2002/0001462 | A1 | * | 1/2002 | Ho .................................. 396/25 |
| 2002/0139394 | A1 | * | 10/2002 | Bronson .......................... 134/6 |
| 2005/0027316 | A1 | * | 2/2005 | Izzo .................................. 607/1 |
| 2007/0261711 | A1 | * | 11/2007 | Fagrenius et al. ................ 134/6 |
| 2008/0245452 | A1 | * | 10/2008 | Law et al. ..................... 150/154 |
| 2008/0259600 | A1 | * | 10/2008 | Pohlert et al. ................ 362/235 |
| 2011/0024314 | A1 | | 2/2011 | Merrill et al. |

* cited by examiner

*Primary Examiner* — Clayton E Laballe
*Assistant Examiner* — Bret Adams
(74) *Attorney, Agent, or Firm* — Mayback & Hoffman, P.A.; Gregory L. Maybeck (57) ABSTRACT

A lens guard for protecting a camera includes a lens-guard housing, a pressurized gas system, and a gas supply. The housing defines an opening and has a transparent protective lens disposed in the opening and having an outer surface exposed to the environment, an upper portion, and a portion defining apertures shaped to respectively receive therein camera support rods operable to mount the lens-guard housing to the camera in front of a lens. The pressurized gas system is operable to remove fluids and debris from the outer surface of the protective lens. The pressurized gas system includes a blow tube mounted to the upper portion of the housing and having a plurality of outlets directed towards the outer surface of the protective lens. The gas supply fluidically connects to the blow tube and is operable to supply pressurized gas to the blow tube and through the outlets thereof.

20 Claims, 5 Drawing Sheets

LENS GUARD

CROSS-REFERENCE TO RELATED APPLICATIONS

This application claims the priority, under 35 U.S.C. §119, of copending U.S. Provisional Patent Application Ser. No. 61/323,011 filed Apr. 12, 2010, the entire disclosure of which is hereby incorporated herein by reference in its entirety.

STATEMENT REGARDING FEDERALLY SPONSORED RESEARCH OR DEVELOPMENT

Not Applicable

FIELD OF THE INVENTION

The present invention lies in the field of camera protection. The present disclosure relates to a lens guard and protective camera cover for protecting a camera lens and camera.

BACKGROUND OF THE INVENTION

Cameras are delicate instruments that need protection from their surroundings, particularly in inclement weather situations. For example, cameras used for filming an outdoor sporting event need protection from rainy weather conditions so that viewers viewing a video of the sporting event do not find the picture obscured by water droplets. Cameras equipped with traditional camera covers typically require the camera operator's hand be inside or underneath the camera cover to access and operate the camera. Moreover, traditional protection of the camera lens merely includes a plastic projection extending beyond the camera lens to help protect against rain. This does not address the problem created when water and dust actually make contact with the camera lens.

Thus, a need exists to overcome the problems with the prior art systems, designs, and processes as discussed above.

SUMMARY OF THE INVENTION

The invention provides a camera lens guard that overcomes the hereinafore-mentioned disadvantages of the heretofore-known devices and methods of this general type and that provide such features with an easy-to-use and water-tight seal against the environment and a lens cover that can be cleared of moisture easily.

With the foregoing and other objects in view, there is provided, in accordance with the invention, a lens guard for protecting a camera. The lens guard includes a lens-guard housing defining an opening and having a transparent protective lens disposed in the opening and having an outer surface exposed to the environment. The lens-guard housing further includes an upper portion and a portion defining first and second apertures shaped to respectively receive therein first and second camera support rods operable to mount the lens-guard housing to the camera in front of a lens. The lens guard also includes a pressurized gas system operable to remove fluids and debris from the outer surface of the protective lens. The pressurized gas system includes a blow tube mounted to the upper portion of the housing. The blow tube has a plurality of outlets directed towards the outer surface of the protective lens. A gas supply is fluidically connected to the blow tube and operable to supply pressurized gas to the blow tube and through the outlets thereof.

In accordance with another feature of the invention, the lens-guard housing further includes a lower portion and grooves in the lower portion shaped to direct fluid and debris away from the outer surface of the protective lens when the pressurized gas is exiting through the outlets.

In accordance with a further feature of the invention, there is provided a visor attached to the upper portion of the housing and shaped to protect at least a portion of the protective lens from weather and glare.

In accordance with an added feature of the invention, there are provided first and second bushings operable to be respectively received within the first and second apertures and, thereby, adjust an inner diameter of each of the first and second apertures to conform to a size of the first and second camera support rods.

In accordance with an additional feature of the invention, the lens-guard housing has a receiving groove formed within the opening about a perimeter thereof to receive therein the protective lens.

In accordance with yet another feature of the invention, the lens-guard housing has a detent formed about an outer circumference thereof and which further includes a protective camera cover operable to water-tightly fit about the detent to attach the protective camera cover to the lens guard and receive the camera therein and protect both the camera and the lens of the camera.

In accordance with yet a further feature of the invention, the protective camera cover is comprised of a transparent, water-proof material and the material is tactile to allow for operation of the camera through the material of the protective camera cover.

In accordance with yet an added feature of the invention, the pressurized gas system has a remote control and is remotely operated.

In accordance with yet an additional feature of the invention, the gas supply has a gas source and fluidically connects the gas source to the blow tube.

In accordance with again another feature of the invention, the gas source is a portable compressed gas cylinder.

With the objects of the invention in view, there is also provided a camera protection device, including a lens guard mountable to a lens-side of a camera for protecting a camera lens thereof. The lens guard has a housing defining an opening and includes: a transparent protective lens disposed in the opening, with an outer surface exposed to the environment; an upper portion; and a portion defining first and second apertures shaped to respectively receive therein first and second camera support rods operable to mount the lens guard to the camera in front of a lens. The lens guard also includes a pressurized gas system operable to remove fluids and debris from the outer surface of the protective lens. The pressurized gas system includes a blow tube mounted to the upper portion of the housing. The blow tube has a plurality of outlets directed towards the outer surface of the protective lens. A gas supply is fluidically connected to the blow tube and operable to supply pressurized gas to the blow tube and through the outlets thereof. The camera protection device further includes a protective camera cover secured to and extending from the lens guard and shaped to enclose the camera therein.

In accordance with again a further feature of the invention, the lens-guard housing further includes a lower portion and grooves formed in the lower portion shaped to direct fluid and debris away from the outer surface of the protective lens when the pressurized gas is exiting through the outlets.

In accordance with again an added feature of the invention, there is also provided a visor attached to the upper portion of the housing and shaped to protect at least a portion of the protective lens from weather and glare.

In accordance with again an additional feature of the invention, there are also provided first and second bushings operable to be respectively received within the first and second apertures and, thereby, adjust an inner diameter of each of the first and second apertures to conform to a size of the first and second camera support rods.

In accordance with still another feature of the invention, the lens-guard housing has a receiving groove formed within the opening about a perimeter thereof to receive therein the protective lens.

In accordance with still a further feature of the invention, the protective camera cover is comprised of a transparent, water-proof material and the material is tactile to allow for operation of the camera through the material of the protective camera cover.

In accordance with still an added feature of the invention, the housing has a detent formed about an outer circumference thereof and the protective camera cover has a gasket operable to form a water-tight fit about the detent to attach the protective camera cover to the lens guard.

In accordance with still an additional feature of the invention, the protective camera cover has a closure mechanism operable to substantially close the protective camera cover around the camera.

In accordance with again an additional feature of the invention, the pressurized gas system has a remote control and is remotely operated.

In accordance with a concomitant feature of the invention, the gas supply has a gas source and fluidically connects the gas source to the blow tube.

Although the invention is illustrated and described herein as embodied in a camera protection device, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Additional advantages and other features characteristic of the present invention will be set forth in the detailed description that follows and may be apparent from the detailed description or may be learned by practice of exemplary embodiments of the invention. Still other advantages of the invention may be realized by any of the instrumentalities, methods, or combinations particularly pointed out in the claims.

Other features that are considered as characteristic for the invention are set forth in the appended claims.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the present invention. Advantages of embodiments of the present invention will be apparent from the following detailed description of the exemplary embodiments thereof, which description should be considered in conjunction with the accompanying drawings in which.

DETAILED DESCRIPTION OF THE INVENTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

Alternate embodiments may be devised without departing from the spirit or the scope of the invention. Additionally, well-known elements of exemplary embodiments of the invention will not be described in detail or will be omitted so as not to obscure the relevant details of the invention.

Before the present invention is disclosed and described, it is to be understood that the terminology used herein is for the purpose of describing particular embodiments only and is not intended to be limiting. The terms "a" or "an", as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

Relational terms such as first and second, top and bottom, and the like may be used solely to distinguish one entity or action from another entity or action without necessarily requiring or implying any actual such relationship or order between such entities or actions. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

Herein various embodiments of the present invention are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Figure 1:
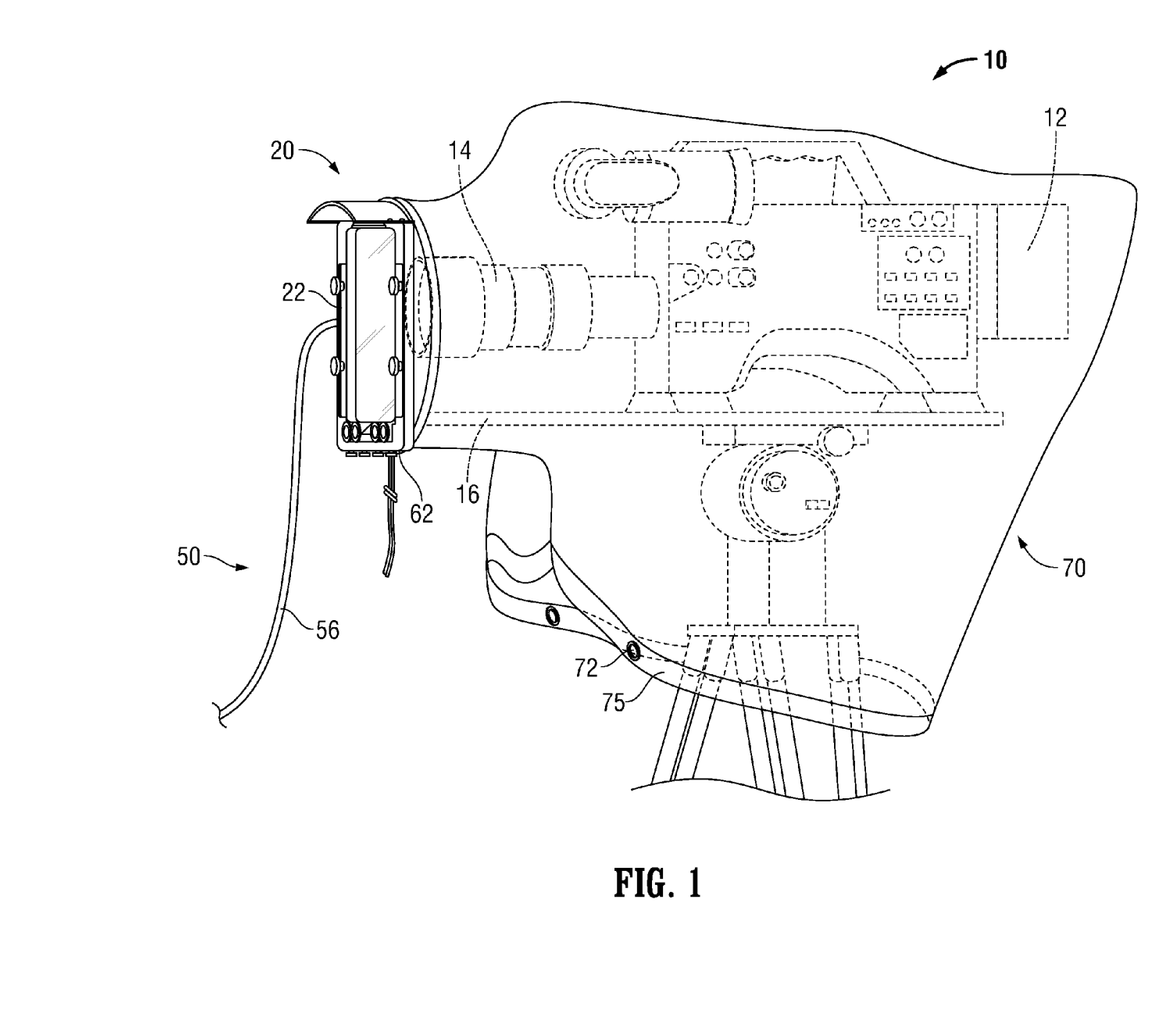
FIG. 1 is a fragmentary, perspective view of a camera-portion of a camera protection device in accordance with the present invention.
Figure 6:
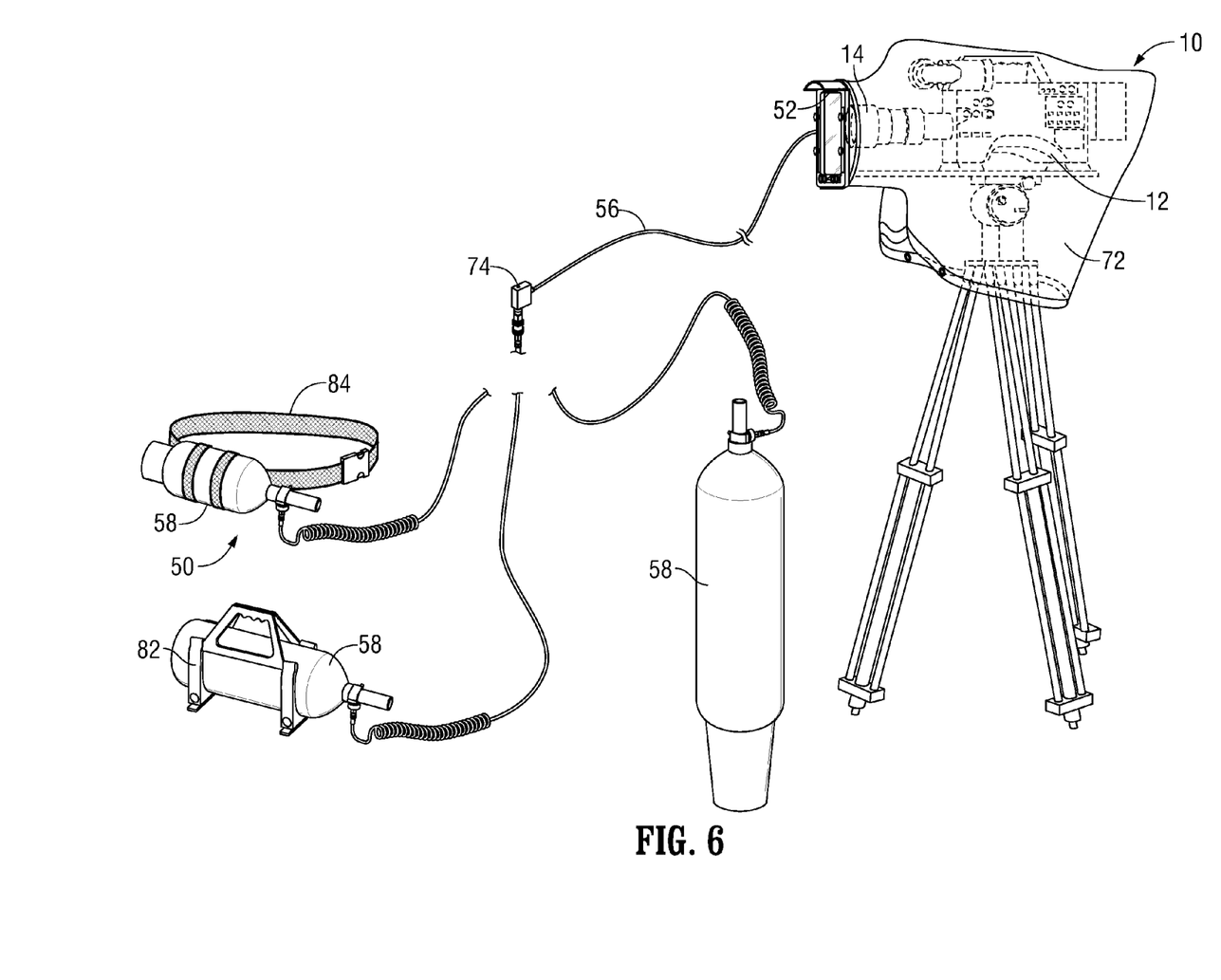
FIG. 6 is a front perspective view of a camera protection device in accordance with the invention including the camera-portion of FIG. 1.

Described now is an exemplary embodiment of the present invention. Referring now to the figures of the drawings in detail and first, particularly to FIG. 1, there is shown an exemplary embodiment of a camera protection device 10 including a lens guard 20, a pressurized gas system 50, and a protective camera cover 70. As shown in FIG. 1, the lens guard 20 is mounted to the lens side of the camera 12, by the camera iris rods 16, for protection of the camera lens 14 (FIG. 6). The protective camera cover 70 is secured to and extends from the lens guard 20 to enclose the camera 12 therein.

Figure 2:
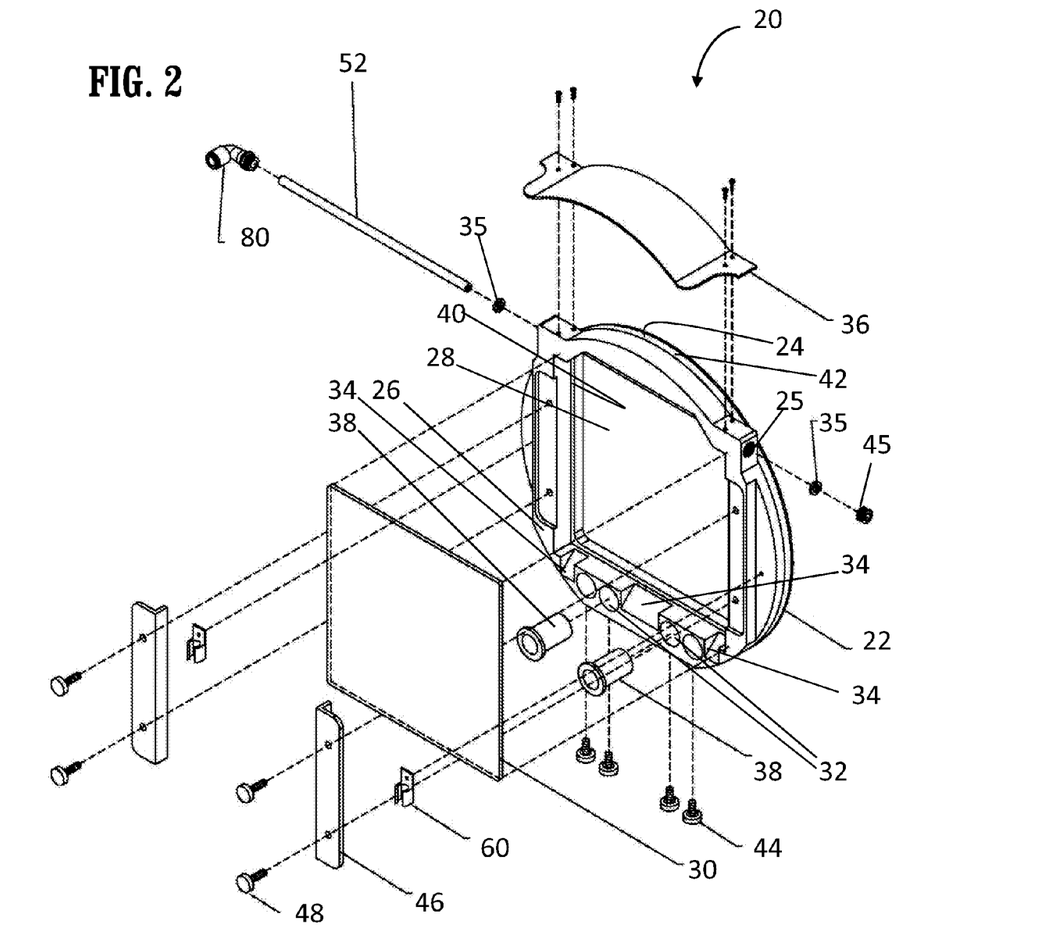
FIG. 2 is an exploded, perspective view of a lens guard of the camera protection device of FIG. 1.

As shown in FIG. 2, the lens guard 20 includes a housing 22 having an opening 28 defining a lens area for receiving a transparent protective lens 30. The protective lens 30 is received within a receiving groove 40 formed within the opening 28, about a perimeter thereof. In this exemplary embodiment, the lens area defined by the receiving groove 40 and the opening 28 are rectangular to accommodate a large variety of lenses 30, such as the well-known "Schneider" lens, e.g., about 6.6 in by about 6.6 in, or any of many available filters or lenses 30. Alternatively, the opening 28 may be circular, ovular, or have any other suitable shape for accommodating a protective lens 30. According to one embodiment of the present invention, the housing 22 is made of 6061 alloy aluminum billet having a thickness of between about 1 and 1.25 in. and a diameter of between about a 9.5 and 10 in.

As further depicted in FIG. 2, the lens-guard housing 22 includes apertures 32 formed through the lower portion 26 of the housing 22 for receiving therein the camera iris rods 16 to mount the lens guard 22 to the camera 12 in front of the camera lens 14. In an exemplary embodiment, the apertures 32 have a standard 19 mm internal diameter (0.748"). However, if desired, bushings 38 may be received within the apertures 32 to adjust selectively the internal diameter of the apertures 32 to accommodate different sized iris rods 16 (e.g., rods having an outer diameter of 15 mm (0.5906") or 17 mm (0.6693")). Iris rods 16 are commonly known in the art and serve multiple functions associated with cameras. The bushings 38 can be secured within the apertures 32 with set screws 44 (e.g., 10-32 L-handles) that are turned into the bottom of threaded openings in the housing 22, as shown in FIG. 2, for example.

In this exemplary embodiment, the lens housing 22 also includes lens clamps 46, flush mounted to each side of the housing 22, with non-illustrated cushions and screws 48 to allow for easy interchange of any number or kind of the protective lenses 30. Alternatively, to allow the lens 30 to be quickly removed for exchange and cleaning, the protective lens 30 may be secured by spring-loaded plungers operable to fit within holes of the housing 22 on either side of the lens 30.

Figure 3:
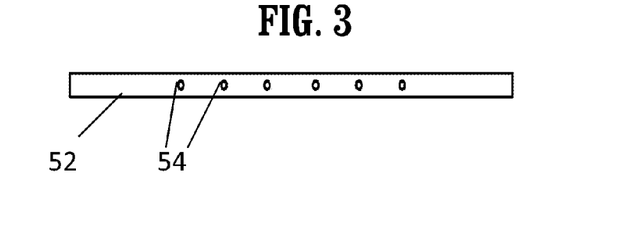
FIG. 3 is an enlarged bottom plan view of a blow tube of the lens guard of FIG. 2.
Figure 7:
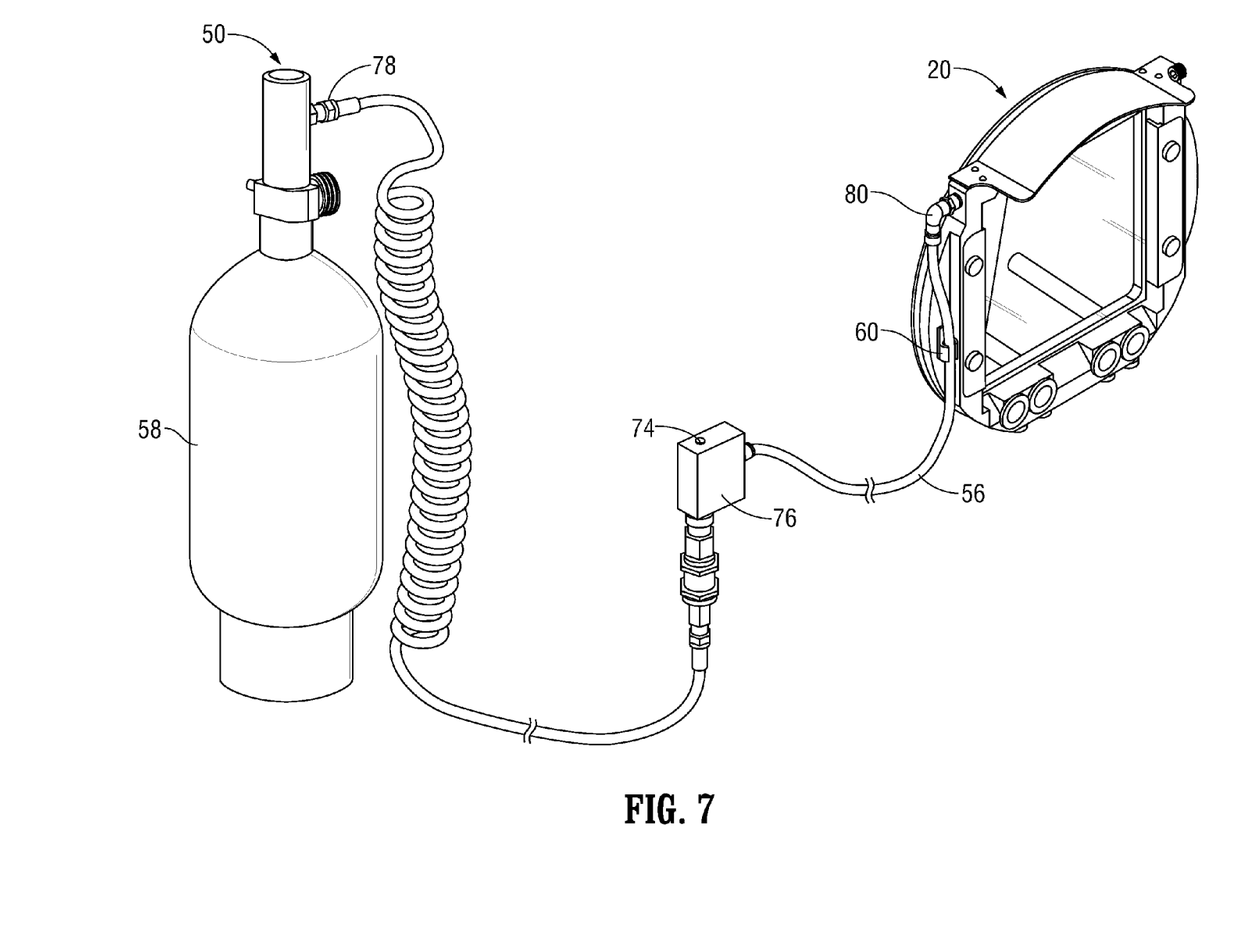
FIG. 7 is a perspective view of the lens guard and pressurized gas system of the camera protection device of FIG. 1.

The inventive lens guard 20 is equipped with a pressurized gas system 50 operable to clear the outer surface of the protective lens 30 of moisture build-up, water droplets, or dust with a pressurized gas, such as compressed air, for example. As used herein, when compressed air is used as the compressed gas, for example, "pressurized" and "high-pressure" are defined in the range of between approximately 50 psi and approximately 4500 psi. The pressurized gas system 50 includes a blow tube 52 mounted within an upper pocket of an upper portion 24 of the lens-guard housing 22. As best illustrated in FIG. 3, the blow tube 52 has a plurality of outlets 54 through which gas exits. The blow tube 52 is mounted in the upper portion 24 of the lens-guard housing 22 with the outlets 54 directed towards the apertures 32. In this way, any pressurized gas exiting the openings 54 is directed against the outer surface of the protective lens 30 in the same direction as gravity. As shown in FIG. 6, the pressurized gas system 50 includes a gas supply tube 56 fluidically connecting a pressurized gas source 58 to the blow tube 52. In this way, any kind of regulator can supply gas (e.g., air) from the pressurized gas source 58 through the gas supply tube 56, the blow tube 52, and out through the outlets 54 thereof to clean the outer surface of the protective lens 30 of fluids and debris. The pressurized gas system 50 forces water drops, for example, off the outer surface of the protective lens 30 with pressure from the pressurized gas source 58, which can be automatic, based upon the detection of moisture on the lens 30 by a moisture-detection system, or manually controlled by a camera operator. In an exemplary embodiment, the pressurized gas source 58 is a compressed air cylinder, e.g., 91Ci, 550Ci, and 1105Ci, examples of which are shown in FIGS. 6 and 7.

As shown in FIG. 6, the compressed air cylinder 58 may be provided with a cradle 82 or belt holder 84 for portable use. Operation of the pressurized gas system 50 can be controlled by merely the touch of switch. As shown in FIGS. 6 and 7, the camera operator can clear the protective lens 30 of water droplets or dust by holding down the switch 74 of the controller 76 to turn the gas supply on, i.e., to transfer gas from the pressurized gas source 58, through the gas supply tube 56, and through the outlets 54 of the blow tube 52. Where the camera 12 is remotely operated, the remote operator can be provided with a remotely controlled switch 74 that can, for example, be actuated via wire or wirelessly.

The gas source connection 78 is configured so that the lens guard 20 can also operate by running off a standard, master compressed gas system found in a typical sports stadium, field, or golf course environment. The gas supply tube connection 80, which connects the gas supply tube 56 to the lens-guard housing 22, and fluidly connects the gas supply tube 56 to the blow tube 52, is adjustable between the left and right sides of the lens-guard housing 22 to accommodate preference of the camera operator. In this exemplary embodiment, and with regard to FIG. 2, the lens-guard housing 22 has a hole 25 formed in each of the right and left sides, through which the blow tube 52 is received and mounted within the upper portion 24 of the housing 22. The hole 25 on one side, e.g., the right side in FIG. 2, is sealed with an o-ring 35 and plug 45 and the hole (not shown) on the opposing side, e.g., the left side in FIG. 2, is sealed with an o-ring 35 and the gas supply tube connection 80 (e.g., an elbow connection) fluidically connecting the blow tube 52 to the gas supply tube 56.

Figure 4:
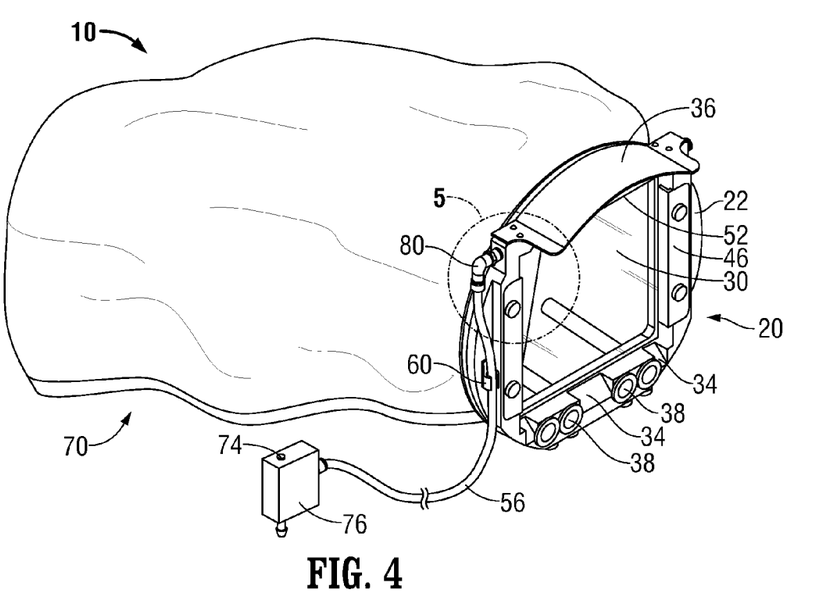
FIG. 4 is a perspective view of the camera protection device of FIG. 1, shown in a non-use position.

As shown in FIGS. 2 and 4, the lens-guard housing 22 includes drainage grooves 34 formed in the lower portion 26 of the housing 22 for directing fluids and debris away from the protective lens 30 outer surface (and away from the camera 12) rather than allow the fluids and debris to accumulate in the bottom of the housing 22. In this embodiment, the housing 22 also includes a protective visor 36 attached to the upper portion 24 of the housing 22, above the blow tube 52, for protecting the protective lens 30, and thus the camera lens 14, from weather and glare. In this exemplary embodiment, the protective lens 30 is recessed from the outermost surface of the housing 22 to further protect against weather, debris, and glare. In addition, the outer surface of the protective lens 30 may be coated with a water-beading solution to aid in the removal of fluids from the protective lens 30.

Figure 5:
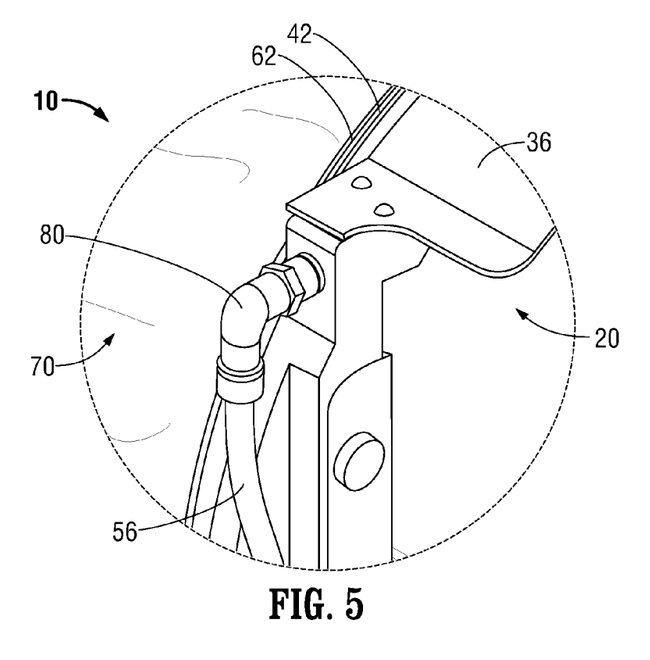
FIG. 5 is a fragmentary, enlarged, side perspective view of a portion of the camera protection device of FIG. 1.

FIGS. 1 and 6 show the protective camera cover 70 in a use position, enclosing therein and protecting a camera 12. FIGS. 4 and 5 show the protective camera cover 70 in non-use position, without a camera enclosed therein. In this exemplary embodiment, the protective camera cover 70 is a transparent plastic material, impervious to water, gas, oil, and most chemicals. In addition, the protective camera cover 70 is extremely strong and difficult to tear or damage. Further, the protective camera cover 70 is very malleable, allowing the camera to be operated from outside the cover, and allows heat to pass therethrough so that the camera operator can operate the camera through the cover 70 even with touch-screen technology.

Referring to FIGS. 2 and 5, the lens-guard housing 22 includes a detent 42 formed about an outer circumference thereof. The protective camera cover 70 is attached to the housing 22 by a gasket 62, e.g., an elastic cord and cord lock, that forms a secure fit about the detent 42. As best illustrated in FIGS. 1 and 6, the protective camera cover 70 has a closure mechanism 72 to close the protective camera cover 70 around the camera 12. In this exemplary embodiment, there is a plurality of openings disposed along a bottom edge 75 of the protective camera cover 70 for receiving therethrough a string, for example, to create a drawstring closure mechanism. Alternatively, the bottom edge 75 of the protective camera cover 70 may include snaps, strips of VELCRO®, any other adhesive material, or any other suitable closure mechanism 72 known by one of ordinary skill in the art to allow the protective camera cover 70 to more securely enclose and protect the camera 12, for example, during windy weather conditions.

The camera protection device 10 protects both the camera 12 and camera lens 14 from inclement weather, such as rain, sleet, snow, and hail, keeps water drops off the protective lens 30, and allows a camera operator to operate the camera 12 in a normal fashion without detriment of picture quality. The pressurized gas system 50 removes fluids and debris from the protective lens 30 so that the view through the camera lens 14 remains unobstructed.

The foregoing description and accompanying drawings illustrate the principles, exemplary embodiments, and modes of operation of the invention. However, the invention should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A lens guard for protecting a camera, comprising:
a lens-guard housing defining an opening and having:
a transparent protective lens disposed in the opening and having an outer surface exposed to the environment;
an upper portion; and
a portion defining first and second apertures shaped to respectively receive therein first and second camera support rods operable to mount the lens-guard housing to the camera in front of a lens; and
a pressurized gas system operable to remove fluids and debris from the outer surface of the protective lens, the pressurized gas system including:
a blow tube mounted to the upper portion of the housing and having a plurality of outlets directed towards the outer surface of the protective lens; and
a gas supply fluidically connected to the blow tube and operable to supply pressurized gas to the blow tube and through the outlets thereof.

2. The lens guard according to claim 1, wherein the housing further comprises:
a lower portion; and
grooves in the lower portion shaped to direct fluid and debris away from the outer surface of the protective lens when the pressurized gas is exiting through the outlets.

3. The lens guard according to claim 1, further comprising a visor attached to the upper portion of the housing and shaped to protect at least a portion of the protective lens from weather and glare.

4. The lens guard according to claim 1, further comprising:
the first and second camera support rods; and
first and second bushings operable to be respectively received within the first and second apertures and, thereby, adjust an inner diameter of each of the first and second apertures to conform to a size of the first and second camera support rods.

5. The lens guard according to claim 1, wherein the housing has a receiving groove formed within the opening about a perimeter thereof to receive therein the protective lens.

6. The lens guard according to claim 1, wherein the housing has a detent formed about an outer circumference thereof and which further comprises a protective camera cover operable to:
water-tightly fit about the detent to attach the protective camera cover to the lens guard; and
receive the camera therein and protect both the camera and the lens of the camera.

7. The lens guard according to claim 6, wherein:
the protective camera cover is comprised of a transparent, water-proof material; and
the material is tactile to allow for operation of the camera through the material of the protective camera cover.

8. The lens guard according to claim 1, wherein the pressurized gas system has a remote control and is remotely operated.

9. The lens guard according to claim 1, wherein the gas supply has a gas source and fluidically connects the gas source to the blow tube.

10. The lens guard according to claim 9, wherein the gas source is a portable compressed gas cylinder.

11. A camera protection device, comprising:
a lens guard mountable to a lens-side of a camera for protecting a camera lens thereof, the lens guard having:
a housing defining an opening and having:
a transparent protective lens disposed in the opening and having an outer surface exposed to the environment;
an upper portion; and
a portion defining first and second apertures shaped to respectively receive therein first and second camera support rods operable to mount the lens guard to the camera in front of a lens; and
a pressurized gas system operable to remove fluids and debris from the outer surface of the protective lens, the pressurized gas system including:

a blow tube mounted to the upper portion of the housing and having a plurality of outlets directed towards the outer surface of the protective lens; and a gas supply fluidically connected to the blow tube and operable to supply pressurized gas to the blow tube and through the outlets thereof; and a protective camera cover secured to and extending from the lens guard and shaped to enclose the camera therein.

12. The camera protection device according to claim 11, wherein the housing further comprises:

a lower portion; and grooves formed in the lower portion shaped to direct fluid and debris away from the outer surface of the protective lens when the pressurized gas is exiting through the outlets.

13. The camera protection device according to claim 11, further comprising a visor attached to the upper portion of the housing and shaped to protect at least a portion of the protective lens from weather and glare.

14. The camera protection device according to claim 11, further comprising:

the first and second camera support rods; and first and second bushings operable to be respectively received within the first and second apertures and, thereby, adjust an inner diameter of each of the first and second apertures to conform to a size of the first and second camera support rods.

15. The camera protection device according to claim 11, wherein the housing has a receiving groove formed within the opening about a perimeter thereof to receive therein the protective lens.

16. The camera protection device according to claim 11, wherein:

the protective camera cover is comprised of a transparent, water-proof material; and the material is tactile to allow for operation of the camera through the material of the protective camera cover.

17. The camera protection device according to claim 11, wherein:

the housing has a detent formed about an outer circumference thereof; and the protective camera cover has a gasket operable to form a water-tight fit about the detent to attach the protective camera cover to the lens guard.

18. The camera protection device according to claim 11, wherein the protective camera cover has a closure mechanism operable to substantially close the protective camera cover around the camera.

19. The camera protection device according to claim 11, wherein the pressurized gas system has a remote control and is remotely operated.

20. The camera protection device according to claim 11, wherein the gas supply has a gas source and fluidically connects the gas source to the blow tube.

\* \* \* \* \*